United States Patent
Dennis et al.

(10) Patent No.: US 11,104,291 B1
(45) Date of Patent: Aug. 31, 2021

(54) OCCUPANT SAFETY SYSTEMS

(71) Applicants: Nathaniel J. Dennis, Cupertino, CA (US); Arturo Llamazares Domper, Campbell, CA (US); Rikard Fredriksson, San Jose, CA (US); Alexander M. Zoellner, Mountain View, CA (US); Lukas Satas, San Jose, CA (US); Jorge C. Fialho, San Jose, CA (US); John J. Baker, Campbell, CA (US); Jesse T. Buehler, Los Altos, CA (US); Ronald A. Bowers, Gilroy, CA (US)

(72) Inventors: Nathaniel J. Dennis, Cupertino, CA (US); Arturo Llamazares Domper, Campbell, CA (US); Rikard Fredriksson, San Jose, CA (US); Alexander M. Zoellner, Mountain View, CA (US); Lukas Satas, San Jose, CA (US); Jorge C. Fialho, San Jose, CA (US); John J. Baker, Campbell, CA (US); Jesse T. Buehler, Los Altos, CA (US); Ronald A. Bowers, Gilroy, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/839,252

(22) Filed: Apr. 3, 2020

Related U.S. Application Data

(63) Continuation of application No. 15/687,828, filed on Aug. 28, 2017, now Pat. No. 10,647,286.
(Continued)

(51) Int. Cl.
*B60R 21/233* (2006.01)
*B60N 2/04* (2006.01)
(Continued)

(52) U.S. Cl.
CPC .............. *B60R 21/233* (2013.01); *B60N 2/04* (2013.01); *B60R 21/013* (2013.01); *B60R 21/18* (2013.01);
(Continued)

(58) Field of Classification Search
CPC . B60R 21/233; B60R 21/232; B60R 21/2338; B60R 21/213; B60R 21/013;
(Continued)

(56) References Cited

U.S. PATENT DOCUMENTS

| | | | |
|---|---|---|---|
| 2,834,606 A * | 5/1958 | Bertrand | B60R 21/214 |
| | | | 280/730.1 |
| 3,494,633 A | 2/1970 | Malloy | |

(Continued)

FOREIGN PATENT DOCUMENTS

KR        1316472        10/2013

OTHER PUBLICATIONS

Serafim, Mircea, InAutoNews, "Safety: 2011 Lexus LFA First Car With SRS Seat Belt Airbag", Dec. 6, 2010, Industry, Lexus, News, Safety, Technology, http://www.inautonews.com/safety-lexus-lfa-srs-seat-belt-airbag, 6 pp.
(Continued)

*Primary Examiner* — Frank B Vanaman
(74) *Attorney, Agent, or Firm* — Young Basile Hanlon & MacFarlane, P.C.

(57) ABSTRACT

Occupant safety systems suitable for use in both traditional and opposed seating systems include various combinations of passive safety components: sensors that provides an output signal indicative of an imminent collision, seats selectively moveable relative to seat support structures in response to the output signal, inflatable restraints deployable from lap portions of a tensioned restraint based on the output signal, airbags deployable from a roof of a vehicle based on
(Continued)

the output signal, cabin dividers deployable from a side of a cabin of the vehicle or the roof of the vehicle based on the output signal, and curtain airbags deployable between an occupant and the side of the cabin of the vehicle based on the output signal.

20 Claims, 13 Drawing Sheets

Related U.S. Application Data

(60) Provisional application No. 62/443,049, filed on Jan. 6, 2017, provisional application No. 62/398,161, filed on Sep. 22, 2016.

(51) Int. Cl.
| | | |
|---|---|---|
| *B60R 21/214* | (2011.01) | |
| *B60R 21/013* | (2006.01) | |
| *B60R 21/213* | (2011.01) | |
| *B60R 21/232* | (2011.01) | |
| *B60R 21/18* | (2006.01) | |
| *B60R 21/2338* | (2011.01) | |
| *B60R 21/231* | (2011.01) | |
| *B60R 21/00* | (2006.01) | |

(52) U.S. Cl.
CPC .......... *B60R 21/213* (2013.01); *B60R 21/214* (2013.01); *B60R 21/232* (2013.01); *B60R 21/2338* (2013.01); *B60R 2021/0048* (2013.01); *B60R 2021/0055* (2013.01); *B60R 2021/23107* (2013.01); *B60R 2021/23161* (2013.01)

(58) Field of Classification Search
CPC .................. B60R 21/18; B60R 21/214; B60R 2021/23107; B60R 2021/23161; B60R 2021/0055; B60R 2021/0048; B60N 2/04
See application file for complete search history.

(56) References Cited

U.S. PATENT DOCUMENTS

| | | | |
|---|---|---|---|
| 3,692,327 A | | 9/1972 | Barrick, Sr. et al. |
| 3,733,038 A | * | 5/1973 | Ikrath .................... B64D 45/02 244/1 A |
| 3,774,936 A | * | 11/1973 | Barnett ................. B60R 21/214 280/730.1 |
| 3,866,940 A | * | 2/1975 | Lewis ..................... B60R 21/18 280/733 |
| 3,897,961 A | | 8/1975 | Leising et al. |
| 4,536,008 A | | 8/1985 | Brown, Jr. |
| 5,470,103 A | | 11/1995 | Vaillancourt et al. |
| 5,863,065 A | | 1/1999 | Boydston et al. |
| 6,352,282 B2 | | 3/2002 | Hirose |
| 6,722,691 B1 | * | 4/2004 | Håland ................. B60R 21/233 280/730.1 |
| 7,322,603 B2 | | 1/2008 | Gray et al. |
| 7,600,780 B2 | | 10/2009 | Tobata et al. |
| 9,511,734 B2 | | 12/2016 | Weerappuli et al. |
| 2002/0011723 A1 | * | 1/2002 | Lewis ..................... B60R 21/18 280/735 |
| 2006/0192367 A1 | | 8/2006 | Zumpano |
| 2006/0212201 A1 | * | 9/2006 | Takahashi ............... B60R 21/36 701/45 |
| 2012/0133114 A1 | | 5/2012 | Choi et al. |
| 2013/0264803 A1 | * | 10/2013 | Schneider ............... B60R 21/18 280/733 |
| 2017/0028876 A1 | | 2/2017 | Yamada |
| 2017/0225641 A1 | | 8/2017 | Faruque et al. |
| 2017/0225788 A1 | | 8/2017 | Humbert |

OTHER PUBLICATIONS

Edelstein, Stephen, Digital Trends, "Mercedes-Benz to Introduce Inflatable Seat Belts", Jul. 23, 2012, http://www.digitaltrends.com/cars/mercedes-benz-to-introduce-inflatable-seat-belts/, 3 pp.
Ford Media, Youtube, "Ford's Inflatable Safety Belts." 2:14 video, published Nov. 5, 2009, available at website: <https://www.youtube.com/watch?v=MN5htEaRk4A>.

* cited by examiner

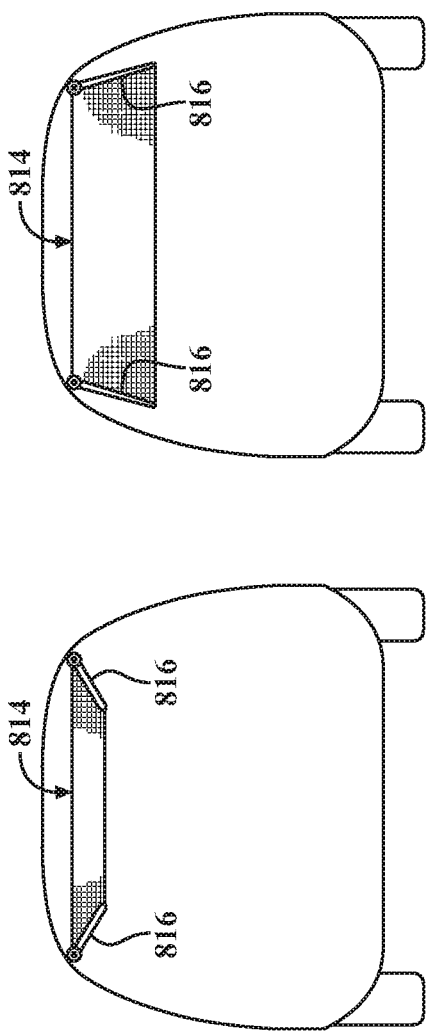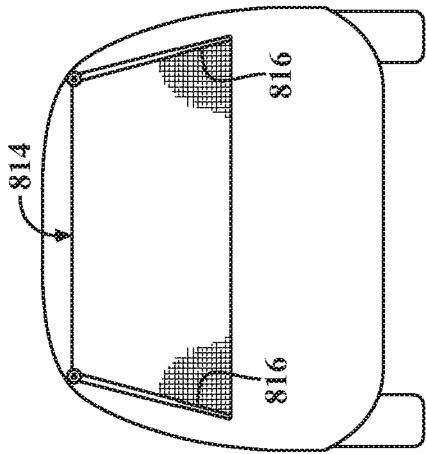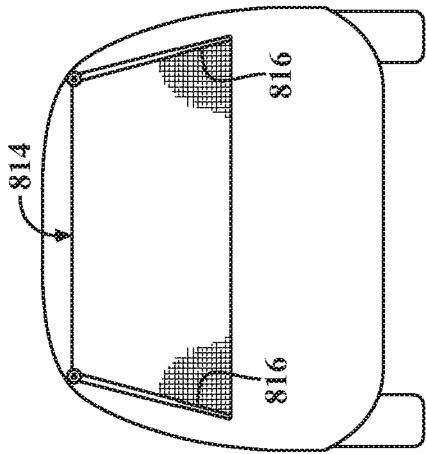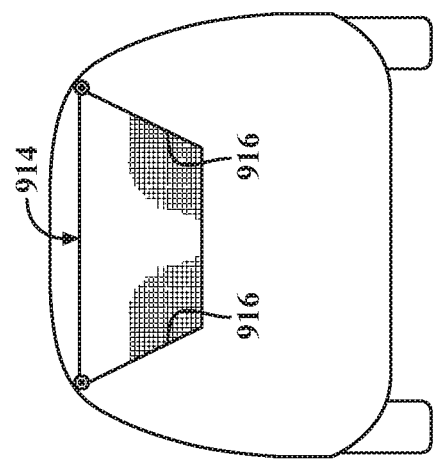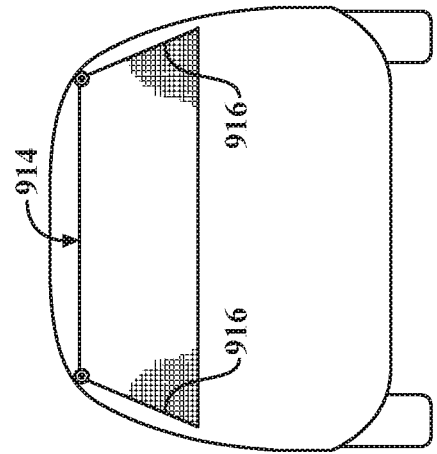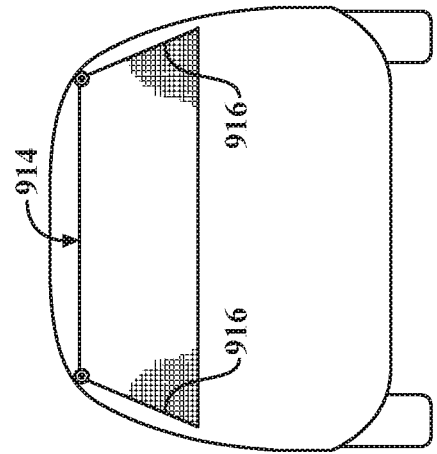

OCCUPANT SAFETY SYSTEMS

CROSS-REFERENCE TO RELATED APPLICATIONS

This application is a continuation of U.S. patent application Ser. No. 15/687,828, filed Aug. 28, 2017, entitled "Occupant Safety Systems," which claims priority to U.S. Provisional Application Ser. No. 62/443,049, filed Jan. 6, 2017, entitled "Occupant Safety Systems," and U.S. Provisional Application Ser. No. 62/398,161, filed Sep. 22, 2016, entitled "Occupant Safety Systems," the contents of which are incorporated herein by reference.

FIELD

The application relates generally to safety systems for vehicles. More particularly, described embodiments relate to dynamic seating systems, cabin dividers, and restraints such as seatbelts and airbags for passenger compartments with opposed or traditional seating.

BACKGROUND

Existing occupant safety systems for traditional, one- two- or three-row vehicles, such as restraints including seatbelts and airbags, can reduce the risk of injury during a collision. Vehicular airbags often use interior components such as dash panels, roof rails, and steering wheels both for packaging purposes and to provide reaction surfaces to interact with the airbags and provide the necessary reaction force. In the absence of adequate reaction surfaces or tethers, airbags would deflect too much to adequately protect an occupant during a collision.

During a collision, occupants are protected from loose objects placed on empty seats within a traditional one- two- or three-row vehicle, such as backpacks or electronic devices, by seat backrests acting as barriers, the backrests impeding motion of the loose objects between the rows of seats. In non-traditional vehicle designs, for example, where rows of occupants face each other within the passenger compartment, there are limited options for reaction surfaces, tethers, and loose-object handling. New approaches to occupant safety systems are thus desired.

SUMMARY

One aspect of the disclosed embodiments is an occupant safety system that includes a sensor that provides an output signal indicative of an imminent collision. The system also includes a tensioned restraint having a lap portion securing an occupant to a seat of a vehicle and an inflatable restraint deployable from the lap portion of the tensioned restraint based on the output signal. The inflatable restraint includes at least one of horizontally-extending chambers allowing for variable pressures along a height of the inflatable restraint and variable heights of deployment of the inflatable restraint and vertically-extending chambers allowing for variable stiffness along a width of the inflatable restraint. A central chamber has a higher stiffness than outer chambers to maintain position of the outer chambers during the imminent collision.

Another aspect of the disclosed embodiments is an occupant safety system that includes a sensor that provides an output signal indicative of an imminent collision. The system also includes an airbag deployable from a roof into a cabin of a vehicle based on the output signal and a tether having a first end coupled to the airbag at a first anchor location. The first anchor location is positioned in front of an occupant being restrained by the airbag during the imminent collision. The tether also has a second end coupled to the vehicle at a second anchor location. The second anchor location is positioned behind an occupant being restrained by the airbag during the imminent collision.

Another aspect of the disclosed embodiments is an occupant safety system that includes a sensor that provides an output signal indicative of an imminent collision and a cabin divider deployable between rows of opposed seats in a vehicle based on the output signal. The cabin divider includes a pair of side arms, each side arm extendable between a stowed position proximate a roof of the vehicle and a deployed position proximate a side of the vehicle. The cabin divider also includes a blocking material extendable between the side arms and between a stowed position proximate the roof of the vehicle and a deployed position stretched along a length of each of the side arms and extending between the pair of side arms.

Another aspect of the disclosed embodiments is an occupant safety system that includes a divider track extending along a roof of a vehicle and a sensor that provides an output signal indicative of an imminent collision. The occupant safety system also includes a cabin divider at least one of translatable or rotatable along the divider track based on the output signal between a stowed position proximate to the roof of the vehicle and a deployed position extending downward from the roof between rows of seats in the vehicle.

Another aspect of the disclosed embodiments is an occupant safety system that includes a sensor that provides an output signal indicative of an imminent collision, a cabin divider deployable from at least one of one of a side of a cabin of a vehicle or a roof of the vehicle in front of an occupant of the vehicle based on the output signal, and at least one of: a curtain airbag deployable between the occupant and a side of the cabin based on the output signal, a roof airbag deployable from the roof of the vehicle in front of the occupant based on the output signal, or a tensioned restraint comprising a lap portion securing the occupant to a seat in the vehicle and a lapbelt airbag deployable from the lap portion of the tensioned restraint based on the output signal.

Another aspect of the disclosed embodiments is an occupant safety system for an opposed seating system that includes a first seat selectively moveable relative to and facing a second seat in the opposed seating system; a motion control device operable to apply a force to the first seat; a sensor that provides an output signal indicative of an imminent collision; and a control unit that controls the force applied to the first seat by the motion control device such that the first seat moves away from the second seat during the collision.

BRIEF DESCRIPTION OF THE DRAWINGS

FIGS. 8A, 8B, and 8C show a motion diagram using a cabin divider as part of an occupant safety system for use in an opposed seating system.

FIGS. 9A, 9B, and 9C show a motion diagram using another cabin divider as part of an occupant safety system for use in an opposed seating system.

DETAILED DESCRIPTION

This disclosure relates to advances in occupant safety systems suitable for use in non-traditional vehicles, such as vehicles including opposed seating systems and lacking traditional airbag packaging and reaction surfaces such as dash panels and steering wheels. Improved occupant safety systems include cabin dividers, dynamic seating systems, and restraints such as tensioned restraints and inflatable restraints, where inflatable restraints include airbags such as self-tethered airbags, seatbelt and/or lapbelt airbags, roof and/or door airbags, etc. that increase safety during a collision for occupants facing each other in an opposed seating configuration. The use of these safety features also allow for increased options in packaging and design in all vehicle passenger compartments regardless of the seating configuration.

Figure 1A:
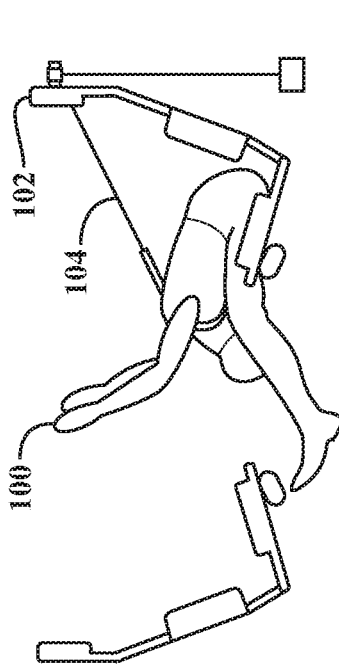
FIGS. 1A and 1B show a motion diagram of a collision.
Figure 1B:
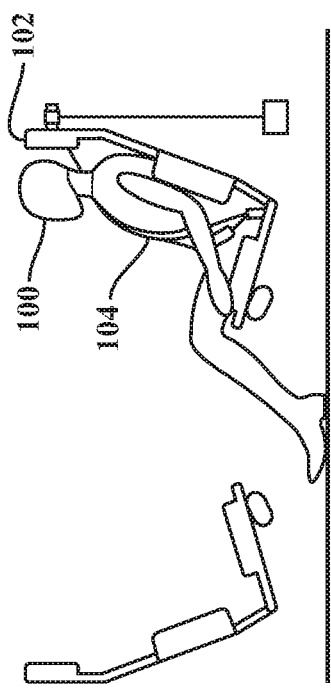

FIGS. 1A and 1B show a motion diagram of a collision in an opposed seating system. The front of the vehicle (not shown) including the opposed seating system is on the left, and the vehicle is moving to the left. In FIG. 1A, pre-collision, an occupant 100 is restrained in a front-facing seat 102 using a tensioned restraint 104, and the tensioned restraint 104 includes a lap portion and a shoulder portion securing the occupant 100 to the front-facing seat 102. In this example, the tensioned restraint 104 can be a seatbelt or a lapbelt. In FIG. 1B, during a front-end, forward motion collision occurring on a left side of the diagram, the occupant 100 is bent forward into the open space of the passenger compartment, greatly extending the tensioned restraint 104. There is a risk of injury to the occupant 100, for example, based on a head of the occupant 100 hitting knees of the occupant 100.

Figure 2A:
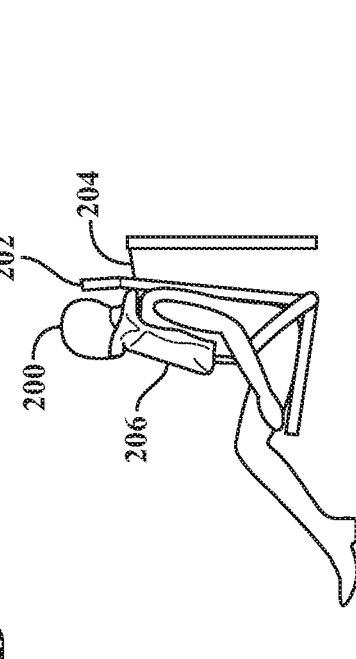
FIGS. 2A and 2B show another motion diagram of a collision.
Figure 2B:
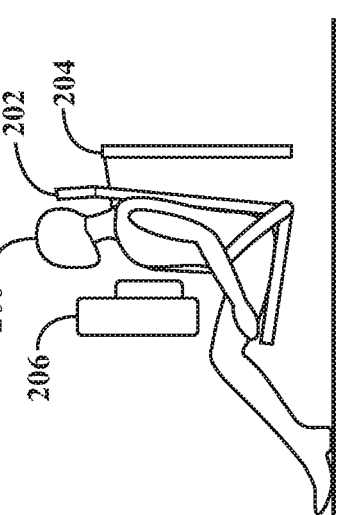

FIGS. 2A and 2B show another motion diagram of a collision. The collision of FIGS. 2A and 2B can also occur in an opposed seating system, though the facing, or opposed, seating rows are not shown. The front of the vehicle (not shown) is on the left, and the vehicle is moving to the left. In FIG. 1A, during a low-speed collision where a tensioned restraint 204 holds an occupant 200 against a front-facing seat 202, a loose object 206, in this example, a backpack, can be launched toward the occupant 200 from, for example, its position on the opposed seat row (not shown). In FIG. 2B, at a later time during the collision than in FIG. 2A, the loose object 206 can impact the occupant 200, potentially causing an injury to the occupant 200. Various occupant safety system components are described below that can reduce or eliminate the potential injuries to the occupants 100, 200 that are possible in the scenarios described by the collision motion diagrams of FIGS. 1A, 1B, 2A, and 2B.

Figure 3A:
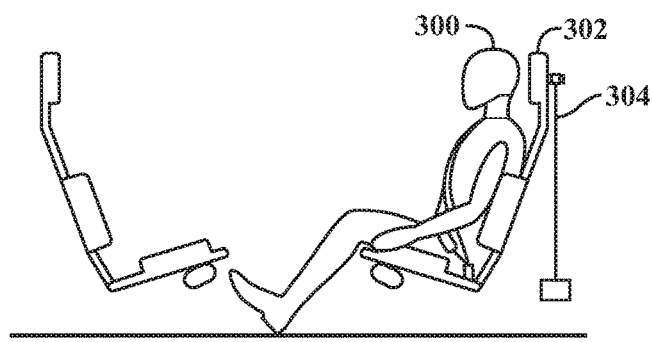
FIGS. 3A, 3B, and 3C show another motion diagram of a collision using a lapbelt airbag as part of an occupant safety system for use in an opposed seating system.
Figure 3B:
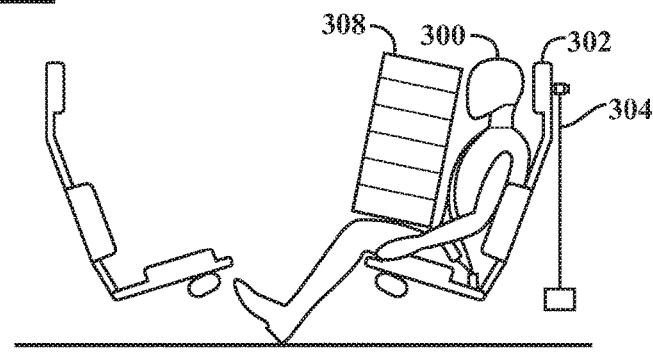
Figure 3C:
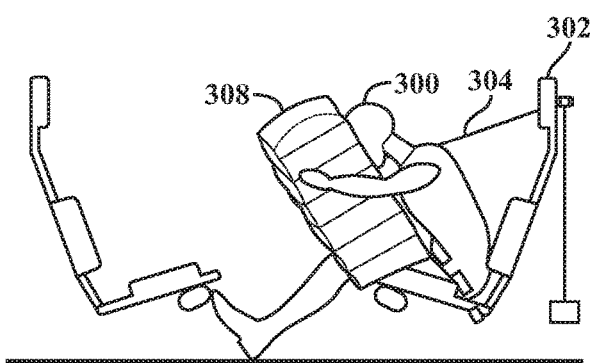

FIGS. 3A, 3B, and 3C show another motion diagram of a collision using one form of a restraint, a lapbelt airbag 308, as part of an occupant safety system for use in an opposed seating system. The front of the vehicle (not shown) including the opposed seating system is on the left, and the vehicle is moving to the left. In FIG. 3A, pre-collision, an occupant 300 is restrained in a front-facing seat 302 using a tensioned restraint 304, and the tensioned restraint 304 includes a lap portion and a shoulder portion securing the occupant 100 to the front-facing seat 302.

In FIG. 3B, during initial stages of a front-end, forward motion collision occurring on a left side of the diagram, the lapbelt airbag 308 is deployed from the lap portion of the tensioned restraint 304, for example, based on input from a collision sensor indicating an imminent collision and through use of an inflator. Other sensors can also be used, alone or in combination with the collision sensor, to provide a signal indicative of an imminent collision. The lapbelt airbag 308 can include a single chamber or multiple chambers, where multiple chambers allow for variable pressures along a height (vertical) or a width (horizontal) of the lapbelt airbag 308 during deployment. For example, the lapbelt airbag 308 shown in FIG. 3B includes horizontally-extending chambers allowing for variable pressures along a height of the lapbelt airbag 308. The lapbelt airbag 308 can also be selectively inflated to variable heights using the horizontally-extending chambers based on a size and position of the occupant 300 in respect to the tensioned restraint 304 and the front-facing seat 302.

In FIG. 3C, during the front-end, forward motion collision, the lapbelt airbag 308 impedes motion of a head of the occupant 300 based on a lap, legs, or both a lap and legs of the occupant 300 acting as a reaction surface for the lapbelt airbag 308, mitigating contact between the head and the legs of the occupant 300. The lapbelt airbag 308 can lower head acceleration, reduce force on a neck of the occupant 300, allow the head, neck, and a chest of the occupant 300 to remain aligned, keep the head and the neck of the occupant 300 from extending, reduce chest compression, and distribute a load across more of the chest than the shoulder portion of the tensioned restraint 304 alone can distribute during the collision.

Figure 4A:
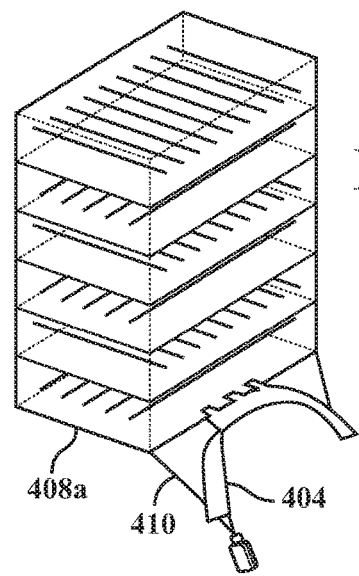
FIG. 4A shows a perspective detail view of the lapbelt airbag of FIGS. 3B and 3C.

FIG. 4A shows a perspective detail view of the lapbelt airbag 308 of FIGS. 3B and 3C, designated here as lapbelt airbag 408a. The lapbelt airbag 408a can be coupled to a lap portion of a tensioned restraint 404 using straps or tethers 410. Through shown as expanding from and coupled to the lap portion of the tensioned restraint 404, the lapbelt airbag 408a can also be packaged within a shoulder portion (not shown) of the tensioned restraint 404. The lapbelt airbag 408a can also be formed of multiple parts, some packaged within the lap portion and some packaged within the shoulder portion of the tensioned restraint 404. Construction of the lapbelt airbag 408a of FIG. 4A includes layers of fabric with transverse straps (indicated by text in FIG. 4A) to stabilize the lapbelt airbag 408a during deployment and vertical straps (also indicated by text) used to improve contact area between the occupant, e.g. the occupant 300, and the lapbelt airbag 408a.

Figure 4B:
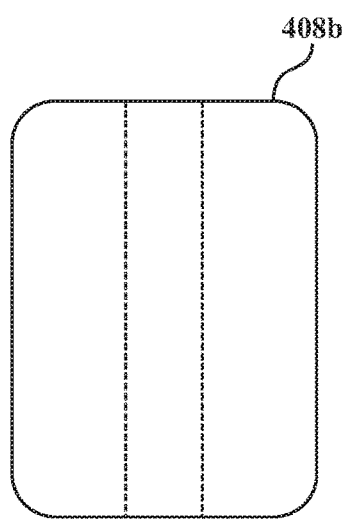
FIG. 4B shows a construction example for the lapbelt airbag of FIGS. 3B and 3C.

FIG. 4B shows another construction example for the lapbelt airbag 308 of FIGS. 3B and 3C, designated here as the lapbelt airbag 408b. In the example of FIG. 4B, the lapbelt airbag 408b is divided into three vertically-extending chambers, the chambers indicated by dotted lines in FIG. 4B. The outer chambers have a traditional inflatable construction of lower stiffness while the central chamber has a drop-stitch construction of higher stiffness. Inflated drop-stitch fabrics have a high overall stiffness including a high bending stiffness. For example, drop-stitch materials are used in stand-up paddle boards, air mattresses, or kayak floors. Use of the drop-stitch construction as a central chamber for the lapbelt airbag 408b allows for a self-tethered airbag that does not require a separate reaction surface. In this sandwich-like lapbelt airbag 408b, the drop-stitch central chamber provides the necessary stiffness so the traditional outer airbags forming the outer chambers maintain position during a collision. Other embodiments include an open-faced sandwich version with two chambers and inclusion of frames of drop-stitch fabric within a single-chamber airbag.

The lapbelt airbags 308, 408a, 408b of FIGS. 3B, 3C, 4A, and 4B can provide protection to the head, the torso, and the legs of the occupant 300 during a collision as the occupant impacts a first surface, for example, a right-most side, of the lapbelt airbags 308, 408a, 408b. The lapbelt airbags 308, 408a, 408b can also provide protection during a collision to the head and torso of the occupant 300 when loose objects, such as the loose object 206 shown in FIGS. 2A and 2B, impact a second surface, for example, a left-most side, of the lapbelt airbags 308, 408a, 408b based on a position of the loose object in an opposing seat to the occupant 300 prior to the collision.

Figure 5A:
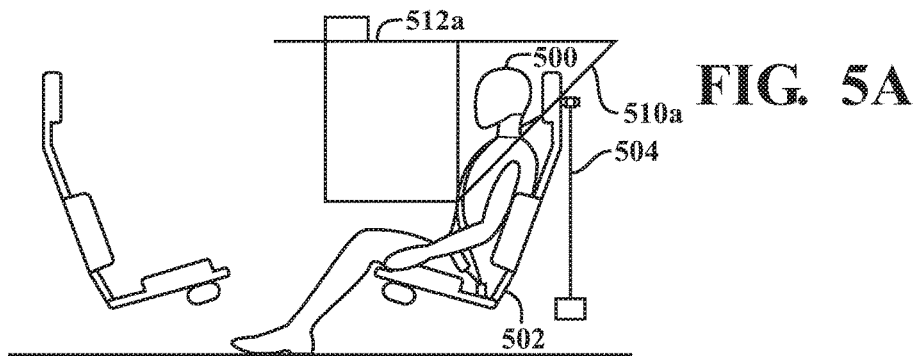
FIGS. 5A, 5B, and 5C show pre-collision diagrams using roof airbags as part of an occupant safety system for use in an opposed seating system.
Figure 5B:
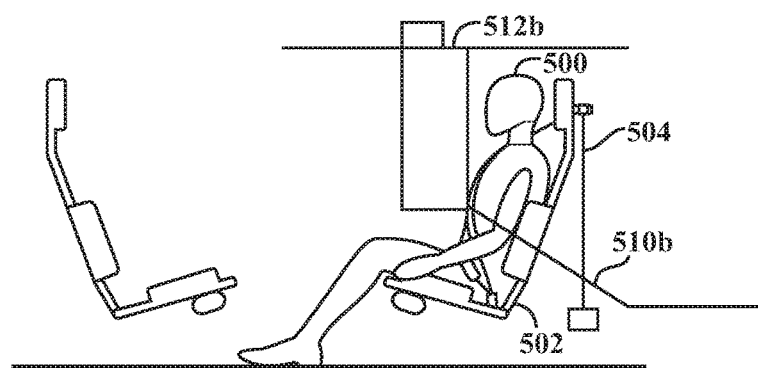
Figure 5C:
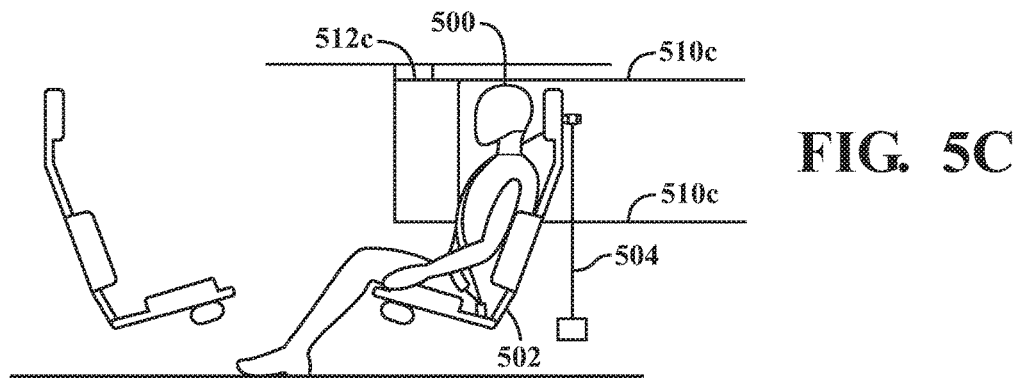

FIGS. 5A, 5B, and 5C show pre-collision diagrams using another type of inflatable restraint, roof airbags 512a, 512b, 512c, as part of an occupant safety system for use in an opposed seating system. The front of the vehicle (not shown) including the opposed seating system is on the left, and the vehicle is moving to the left. In FIGS. 5A, 5B, and 5C, an occupant 500 is restrained in a front-facing seat 502 using a tensioned restraint 504 including a lap portion and a shoulder portion securing the occupant 500 to the front-facing seat 502. The roof airbags 512a, 512b, 512c, though shown as inflated, may not fully deploy prior to a collision. The occupant 500 is also shown as not yet in contact with the roof airbags 512a, 512b, 512c in each of FIGS. 5A, 5B, and 5C.

In FIG. 5A, the roof airbag 512a is fixed to the roof and deployed from a location on the roof forward of the occupant 500 in the front-facing seat 502, that is, between the two rows of opposed seats. A tether 510a extends from one end coupled to an anchor location at a bottom-right corner of the inflated roof airbag 512 to another end coupled to an anchor location on the roof of the vehicle behind the occupant 500 in the front-facing seat 502. Another tether (not shown) can extend from another anchor location at another bottom corner of the inflated roof airbag 512 to another anchor location on the roof of the vehicle behind the occupant 500 in order to create four total airbag anchor locations, that is, two on the roof airbag 512a and two on the roof. The roof airbag 512a of FIG. 5A can span either the single front-facing seat 502 or two seats with two passengers using a two-tether configuration. The cavity of the roof airbag 512a can include a small number of internal tethers (not shown) for stability. The cavity can also be split vertically into a high pressure support chamber and low pressure occupant-facing chambers in a similar manner to that described in respect to the lapbelt airbag 408b of FIG. 4B.

In FIG. 5B, the roof airbag 512b is fixed to the roof and deployed from a location on the roof forward of the front-facing seat 502. A tether 510b extends from one end coupled to an anchor location at a bottom-right corner of the inflated roof airbag 512b to another end coupled to an anchor location on or near a rear surface of the vehicle (not shown) located behind the occupant 500 in the front-facing seat 502. Another tether (not shown) can extend from another anchor location at another bottom corner of the inflated roof airbag 512b in to another anchor location on or near the rear surface of the vehicle located behind the occupant 500 in order to create two anchor locations for the roof airbag 512b. The roof airbag 512b has a width less than half of a width of the roof airbag 512a shown in FIG. 5A. The reduction in width or thickness is possible due to the extension of the tether 510b being approximately horizontal when compared to the angled extension of the tether 510a of FIG. 5A. Reduction in collision loads experienced by the occupant 500 can be similar for the roof airbags 512a, 512b.

In FIG. 5C, the roof airbag 512c is detached from the roof upon deployment, dropping down to be properly located once deployed from a location on the roof forward of the front-facing seat 502. Two tethers 510c extends from first ends coupled to anchor locations at a bottom-right corner and a top-right corner of the inflated roof airbag 512c to second ends coupled to anchor locations on a rear surface of the vehicle (not shown) located behind the occupant 500 in the front-facing seat 502. Alternatively or additionally, the tethers 510c may extend from anchor locations at a bottom-left corner and a top-left corner of the inflated roof airbag 512c to anchor locations on the rear surface of the vehicle. The tethers 510c may be anchored to a high-pressure portion of the roof airbag 512c. In this example, the roof airbag 512c is approximately the same width of the roof airbag 512b. The roof airbag 512c can be dropped down vertically within the passenger compartment to a location that allows legs of the occupant 500 to be used as a reaction surface.

The tethers 510a, 510b, 510c can be fixed in load or pay out at a determined or selectable load, functioning in a similar manner to a retractor used with a seat-based tensioned restraint. The tethers 510a, 510b, 510c can also be packaged so as to be hidden, such as within a trim component such as a headliner or affixed to window glass and covered with vehicle trim. The tethers 510a, 510b, 510c can be routed around window glass such that any slack will be taken in very quickly using a pretensioner. Each of the roof airbags 512a, 512b, 512c can deploy from a location packaged within trim extending from the roof or can alternatively be packaged to deploy from a door, an armrest, or a center console (not shown). The roof airbags 512a, 512b, 512c can also be used to protect the occupant 500 from loose objects during a collision.

Figure 6A:
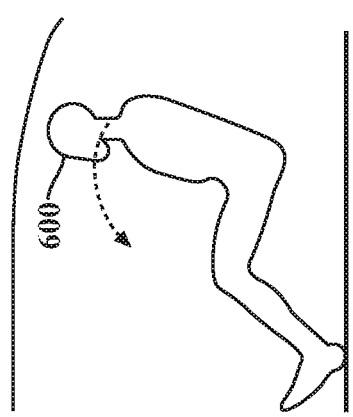
FIGS. 6A, 6B, 6C, and 6D show pre-collision diagrams using roof airbags as part of an occupant safety system.
Figure 6B:
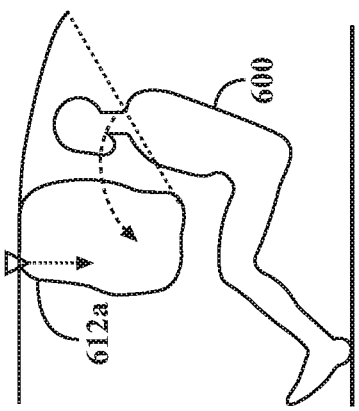
Figure 6C:
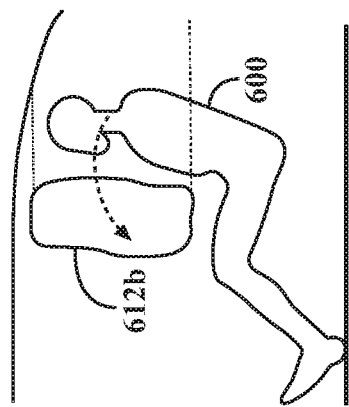
Figure 6D:
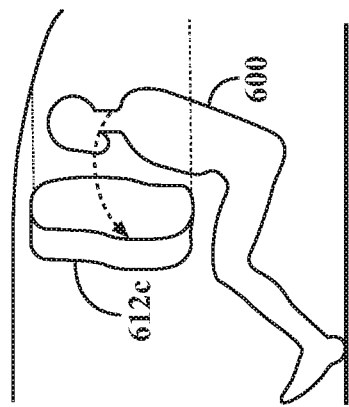

FIGS. 6A, 6B, 6C, and 6D show pre-collision diagrams using roof airbags 612a, 612b, 612c as part of an occupant safety system. FIG. 6A shows an occupant 600 prior to deployment of any airbags in a vehicle moving toward a left side of the frame. FIG. 6B shows the occupant 600 positioned in reference to the deployed roof airbag 612a with the roof airbag 612a being coupled to the deployment location on the roof. FIG. 6C shows the occupant 600 positioned in reference to the deployed roof airbag 612b with the roof airbag 612b being decoupled from a packaging location on the roof to a position consistent with properly restraining a head and a torso of the occupant 600. The position of the decoupled, deployed roof airbag 612b can be based, for example, on a height and size of the occupant 600. FIG. 6D shows the occupant 600 positioned in reference to the deployed roof airbag 612c with the roof airbag 612c being decoupled from a packaging location on the roof and including two vertically-extending chambers, one of a higher pressure (p1) and/or higher stiffness and one of a lower pressure (p2) and/or lower stiffness. The higher pressure (p1) may be at least two times the lower pressure (p2), or, for example, orders of magnitude greater than the lower pressure (p2).

Figure 7A:
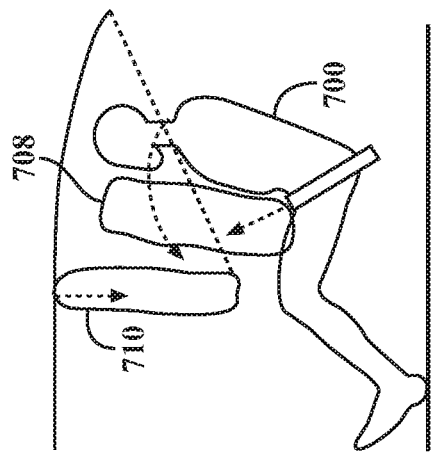
FIGS. 7A, 7B, and 7C show pre-collision diagrams using a combination of a lapbelt airbag and a roof airbag as part of an occupant safety system.
Figure 7B:
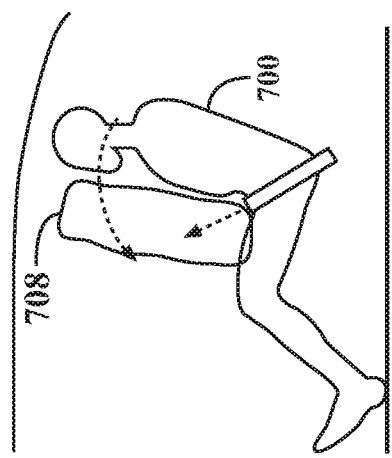
Figure 7C:
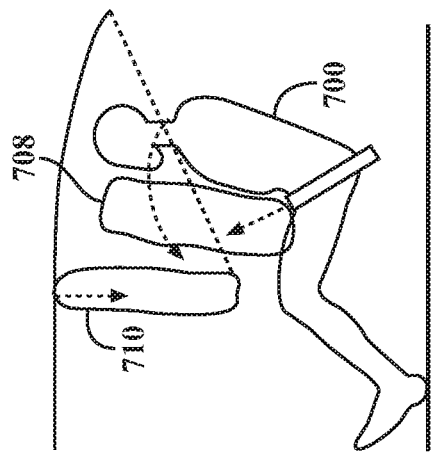

FIGS. 7A, 7B, and 7C show pre-collision diagrams using a combination of tensioned and inflatable restraints, e.g. a lapbelt airbag 708 and a roof airbag 710, as part of an occupant safety system. FIG. 7A shows an occupant 700 prior to deployment of any airbags in a vehicle moving toward a left side of the frame. FIG. 7B shows the occupant 700 positioned in reference to the deployed lapbelt airbag 708, with the lapbelt airbag 708 deploying before the roof airbag 710 in this pre-collision example. FIG. 7C shows the occupant 700 positioned in reference to both the deployed lapbelt airbag 708 and the deployed roof airbag 710. In this example, the lapbelt airbag 708 is deployed at a position in the vehicle between the occupant 700 and the deployed roof airbag 710. The roof airbag 710 has a thinner construction and a higher pressure (p1) than a pressure (p2) of the lapbelt airbag 708. Given the pressure differential, with p1>p2, the roof airbag 710 can serve as a reaction surface for the lapbelt airbag 708 when restraining the occupant 700 during a collision.

FIGS. 8A, 8B, and 8C show a motion diagram using a cabin divider 814 as part of an occupant safety system for use in an opposed seating system. The cabin divider 814 is a first example of a variety of cabin dividers for use in partitioning or dividing a passenger compartment of a vehicle, for example, between rows of opposed seats where occupants face each other. Cabin dividers can be fixed or deployable and formed from blocking material such as mesh, elastic, cloth, or any other material suitable for both compact storage and blocking loose objects from crossing sides of the passenger compartment once deployed. Cabin dividers can be deployed using a variety of mechanical systems, many of which are described herein. In some examples (not shown), cabin dividers can be deployed using inflatable tubes or airbags along sides of a mesh surface in order to extend the cabin divider between sides of the passenger compartment.

FIG. 8A shows the cabin divider 814 as a telescoping mechanical system in a position at the beginning of deployment just after leaving a stowed position proximate a roof of the vehicle. Side arms 816 of the cabin divider 814 have begun to rotate about fixed pivots at top-most ends of the side arms 816 and a mesh-type blocking material starts to extend downward between the side arms 816. FIG. 8B shows the cabin divider 814 in a position in the middle of deployment. The side arms 816 have begun to telescope downward from a roof of the vehicle, extending the blocking material further downward into the passenger compartment. FIG. 8C shows the cabin divider 814 in a deployed position where deployment is complete. The side arms 816 have reached full telescoping extension along sides of the vehicle, and the blocking material divides the passenger compartment by extending along a length of each of the side arms 816 and between the side arms 816.

FIGS. 9A, 9B, and 9C show a motion diagram using another cabin divider 914 as part of an occupant safety system for use in an opposed seating system. FIG. 9A shows the cabin divider 914 as a wiper-style mechanical system in a position at the beginning of deployment just after leaving a stowed position proximate a roof of the vehicle. Side arms 916 of the cabin divider 914 have begun to rotate about fixed pivots at top-most ends of the side arms 916 and a mesh-type blocking material starts to stretch between the side arms 916. FIG. 9B shows the cabin divider 914 in a position in the middle of deployment. The side arms 916 are rotated approximately 45 degrees from the stowed position near the roof, and the blocking material begins to bisect the passenger compartment. FIG. 9C shows the cabin divider 914 in a deployed position where deployment is complete. The side arms 916 have rotated such that lower-most ends of the side arms 916 are proximate to sides of the vehicle, and the blocking material is fully extended along a length of each of the side arms 916 and stretched between the side arms 916 to divide the passenger compartment.

Figure 10A:
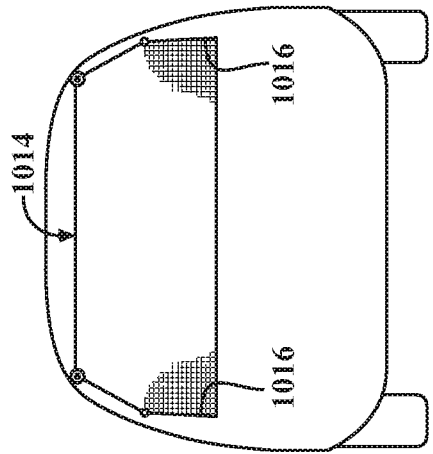
FIGS. 10A, 10B, and 10C show a motion diagram using another cabin divider as part of an occupant safety system for use in an opposed seating system.
Figure 10B:
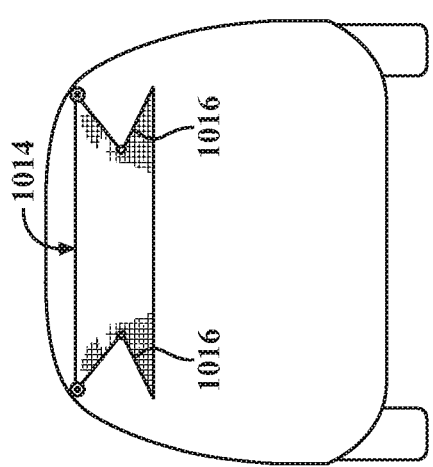
Figure 10C:
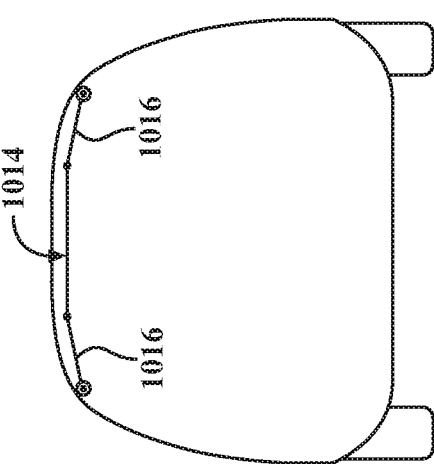

FIGS. 10A, 10B, and 10C show a motion diagram using another cabin divider 1014 as part of an occupant safety system for use in an opposed seating system. FIG. 10A shows the cabin divider 1014 as a hinged or accordion-style mechanical system in a stowed position proximate a roof of the vehicle prior to deployment. Side arms 1016 of the cabin divider 1014 are stowed near the roof of the vehicle and a mesh-style blocking material is collapsed between the side arms 1016. FIG. 10B shows the cabin divider 1014 in a position in the middle of deployment. The side arms 1016 have begun to expand, unfolding from a centrally located hinge, and the blocking material begins to bisect the passenger compartment. FIG. 10C shows the cabin divider 1014 in a deployed position where deployment is complete. The side arms 1016 have fully unfolded such that lower-most ends of the side arms 1016 are proximate to sides of the vehicle, and the blocking material is fully extended along a length of each of the side arms 1016 and fully stretched between the side arms 1016 to divide the passenger compartment.

Figure 11A:
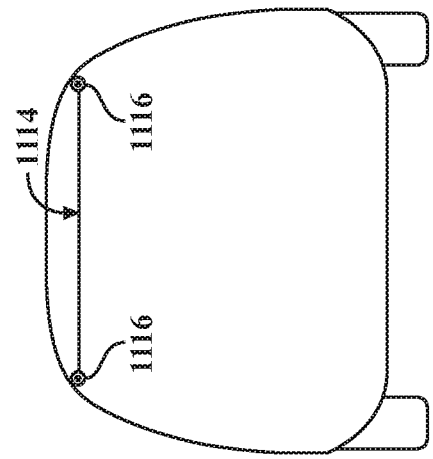
FIGS. 11A, 11B, and 11C show a motion diagram using another cabin divider as part of an occupant safety system for use in an opposed seating system.
Figure 11B:
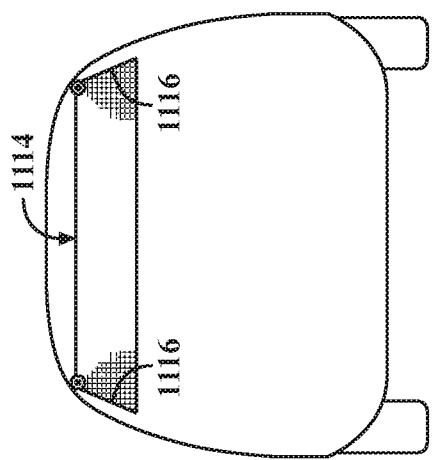
Figure 11C:
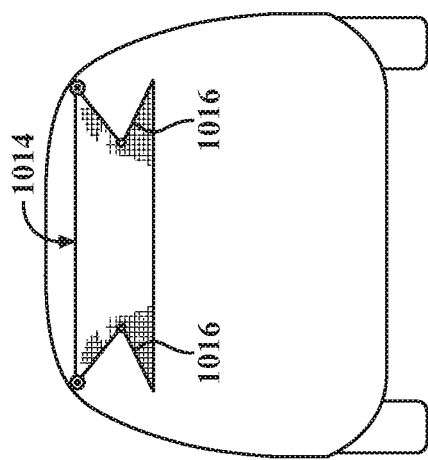

FIGS. 11A, 11B, and 11C show a motion diagram using another cabin divider 1114 as part of an occupant safety system for use in an opposed seating system. FIG. 11A shows the cabin divider 1114 as an extendable-style mechanical system in stowed position proximate to a roof of the vehicle prior to deployment. Side arms 1116 of the cabin divider 1114 can be fabricated from a material that can be spooled onto a reel and stored in a stowed position near the roof of the vehicle and a mesh-style blocking material that is spooled with and extendable between the side arms 1116. The side arms 1116 can be extendable semi-rigidly in a deployed position to pull the blocking material taught, for example, the side arms 1116 can be fabricated from spring steel. FIG. 11B shows the cabin divider 1114 in a position in the middle of deployment. The side arms 1116 have begun to expand, extending downward from a stowed position, and the blocking material begins to bisect the passenger compartment. FIG. 11C shows the cabin divider 1114 in a deployed position where deployment is complete. The side arms 1116 have fully extended such that lower-most ends of the side arms 1116 are proximate to sides of the vehicle, and the blocking material is fully extended along a length of each of the side arms 1116 and fully stretched between the side arms 1116 to divide the passenger compartment.

Figure 12A:
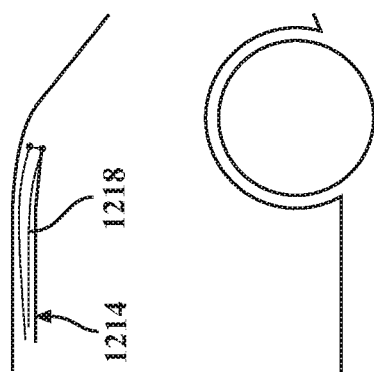
FIGS. 12A, 12B, and 12C show a motion diagram using another cabin divider as part of an occupant safety system for use in an opposed seating system.
Figure 12B:
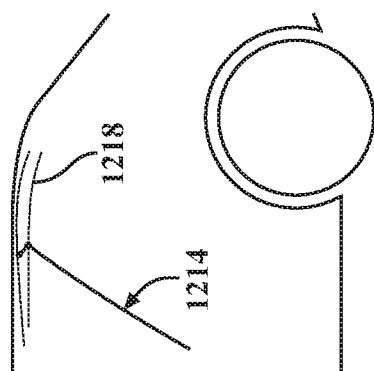
Figure 12C:
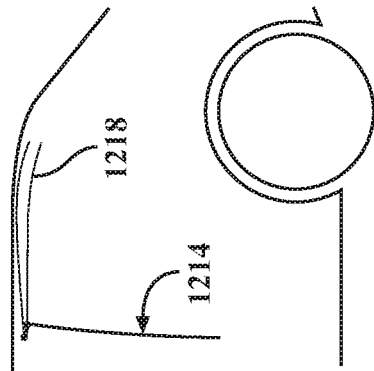

FIGS. 12A, 12B, and 12C show a motion diagram using another cabin divider 1214 as part of an occupant safety system for use in an opposed seating system. FIG. 12A shows the cabin divider 1214 as a fixed, garage-door style mechanical system in a stowed position with the blocking material of the cabin divider 1214 nestled within a divider track 1218. FIG. 12B shows the cabin divider 1214 with the blocking material in a position in the middle of deployment. The blocking material of the cabin divider 1214 has both rotated approximately 45 degrees about a pivot and translated in a left direction along the divider track 1218. FIG. 12C shows the blocking material of the cabin divider 1214 in a position where deployment is complete. The blocking material of the cabin divider 1214 has moved with the pivot to a left-most end of the divider track 1218 and is rotated approximately 90 degrees to a deployed position from its stowed position of FIG. 12A such that the blocking material of the cabin divider 1214 divides the passenger cabin. In this example, the blocking material can be mesh, foam, lattice, polymer, or any other material suitable to block movement.

Figure 13A:
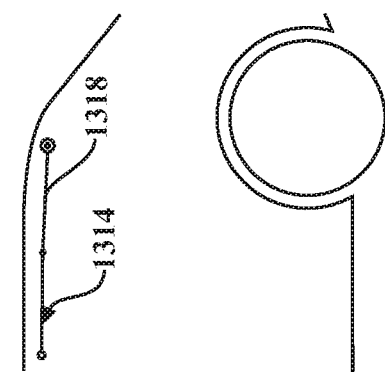
FIGS. 13A, 13B, and 13C show a motion diagram using another cabin divider as part of an occupant safety system for use in an opposed seating system.
Figure 13B:
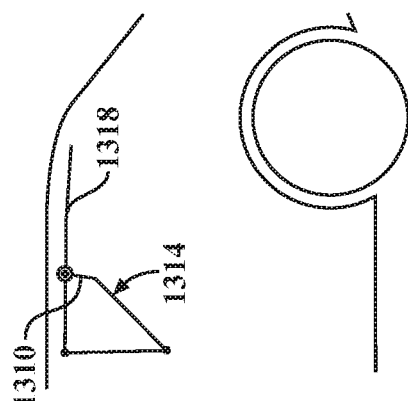
Figure 13C:
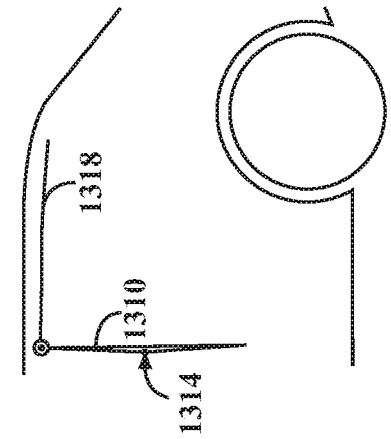

FIGS. 13A, 13B, and 13C show a motion diagram using another cabin divider 1314 as part of an occupant safety system for use in an opposed seating system. FIG. 13A shows the cabin divider 1314 as a folding, hinged, pivoted, and tracked mechanical system in a stowed position with blocking material of the cabin divider 1314 unfolded to fit within a divider track 1318. FIG. 13B shows the cabin divider 1314 with the blocking material in a position in the middle of deployment. The blocking material of the cabin divider 1314 has started to fold at a central hinged location and a right-most end of the blocking material is both translating in a left direction along the divider track 1318 with a pivot and lowering into the passenger compartment under guidance of a tether 1310. FIG. 13C shows the cabin divider 1314 in a position where deployment is complete. The cabin divider 1314 has moved to a left-most end of the divider track 1318, the central hinge of the cabin divider 1314 is unfolded, and the tether 1310 is fully extended between the divider track 1318 and a lower-most end of the blocking materials of the cabin divider 1314 such that the cabin divider 1314 divides the passenger cabin.

Figure 14A:
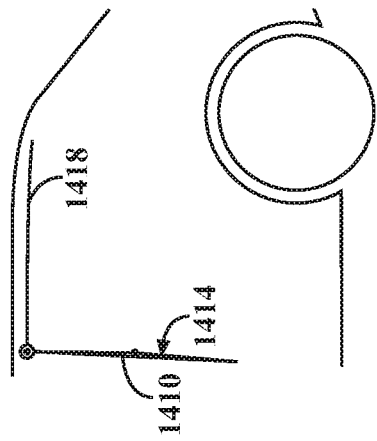
FIGS. 14A, 14B, and 14C show a motion diagram using another cabin divider as part of an occupant safety system for use in an opposed seating system.
Figure 14B:
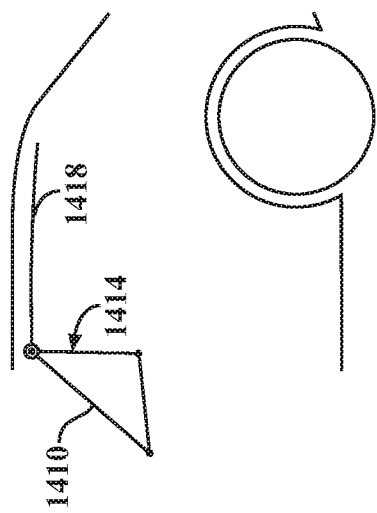
Figure 14C:
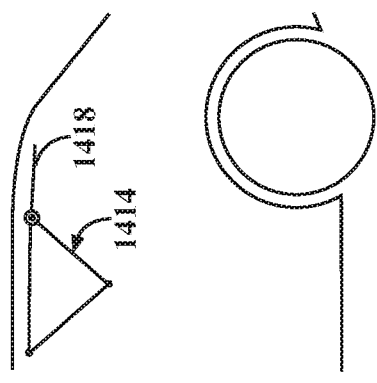

FIGS. 14A, 14B, and 14C show a motion diagram using another cabin divider 1414 as part of an occupant safety system for use in an opposed seating system. FIG. 14A shows the cabin divider 1414 as a folding, hinged, pivoted, and tracked mechanical system just after being in a stowed position with the cabin divider 1414 folding as a pivot starts to move or translate left along a divider track 1418. FIG. 14B shows the cabin divider 1414 in a position in the middle of deployment. Blocking material of the cabin divider 1414 has started to stretch and unfold at a hinged location after the pivot reaches a left-most side of the divider track 1418. A bottom-most end of the blocking material of the cabin divider 1414 is rotating about the hinge and extending from the pivot under guidance of a tether 1410. FIG. 14C shows the cabin divider 1414 in a deployed position where deployment is complete. The blocking material of the cabin divider 1414 is at the left-most end of the divider track 1418, the hinge of the cabin divider 1414 is unfolded, and the tether 1410 is fully extended between the pivot on the divider track 1418 and the bottom-most end of the cabin divider 1414 such that the blocking material of the cabin divider 1414 divides the passenger cabin.

Figure 15A:
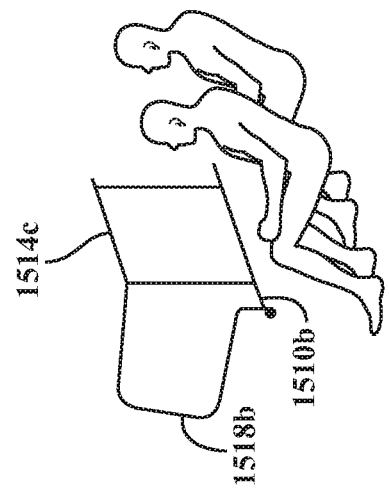
FIGS. 15A, 15B, and 15C show expanded versions of cabin dividers used as part of an occupant safety system for use in an opposed seating system.
Figure 15B:
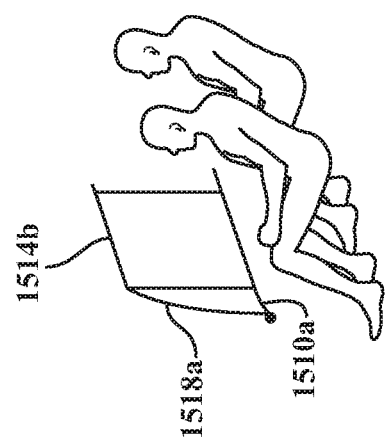
Figure 15C:
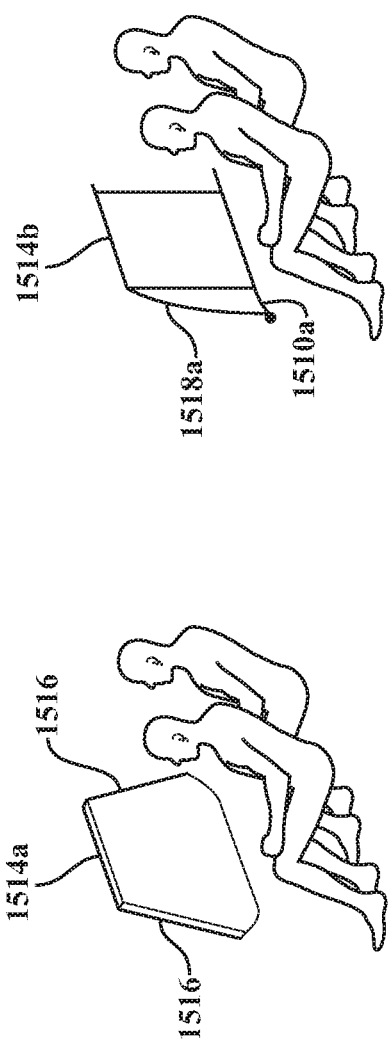

FIGS. 15A, 15B, and 15C show expanded versions of cabin dividers 1514a, 1514b, 1514c used as part of an occupant safety system for use in an opposed seating system. FIG. 15A shows the cabin divider 1514a as a fan-style or barn-door type mechanism where the blocking material extends between side arms 1516 using a sideways deployment. To reach the fully extended position, at least one of the side arms 1516 can be rotatable, telescoping, and/or translatable away from the other of the side arms 1516. FIG. 15B shows the cabin divider 1514b as a rolling-blind-style mechanism with a lower edge of the blocking material pulled downward during deployment to follow a tether 1510a anchored to a track 1518a running along a side of the vehicle and movable, for example, using a retractor. The blocking material, such as mesh or cloth, is stored in a roll at a location near the roof. FIG. 15C shows the cabin divider 1514c as a rolling-blind-style mechanism with a lower edge of the blocking material pulled downward during deployment to follow a tether 1510b anchored to a track 1518b, for example, that runs around a window on a side of the vehicle and is movable using a retractor.

Various cabin dividers extendable using tethers, such as the cabin dividers 1314, 1414, 1514b, 1514c described in respect to FIGS. 13A, 13B, 13C, 14A, 14B, 14C, 15B, and 15C, can use tethers that are fixed in nature, tethers that are controlled to move along a track, tethers that pay out at a determined or selectable load, using, for example, a pretensioner or retractor, and tethers that are routed in a manner such that any slack in the tether can be controlled by the pretensioner or retractor. Various versions of the tethers can be designed to absorb energy, working with the mesh to control impact, for example, of loose objects.

Figure 16A:
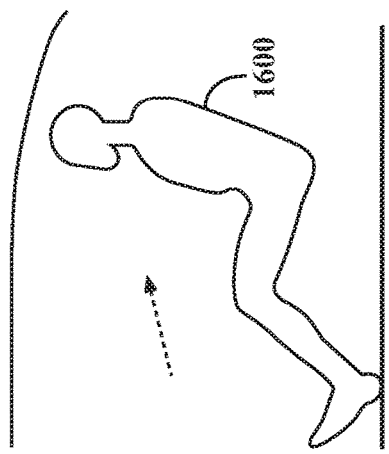
FIGS. 16A, 16B, and 16C show pre-collision diagrams using a combination of a cabin divider and a lapbelt airbag or a roof airbag as part of an occupant safety system.
Figure 16B:
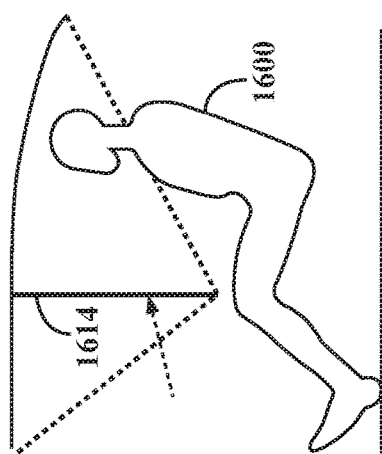
Figure 16C:
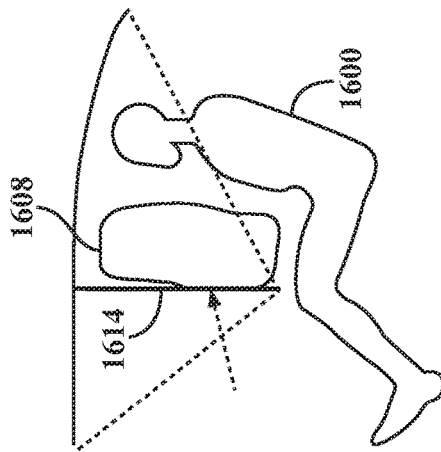

FIGS. 16A, 16B, and 16C show pre-collision diagrams using a combination of a cabin divider 1614 and inflatable restraints such as a lapbelt airbag 1608 (or a roof airbag) as part of an occupant safety system. FIG. 16A shows an occupant 1600 prior to deployment of any airbags or cabin dividers. A loose object is shown on a trajectory (using only a dotted line) toward the occupant 1600. FIG. 16B shows the occupant 1600 positioned in reference to the deployed cabin divider 1614, with blocking material of the cabin divider 1614 stopping the loose object in its trajectory toward the occupant 1600 and deploying before the lapbelt airbag 1608 in this pre-collision example. FIG. 16C shows the occupant 1600 positioned in reference to both the deployed lapbelt airbag 1608 and the deployed cabin divider 1614. The lapbelt airbag 1608 can be used along with the cabin divider 1614 to provide greater protection to the occupant 1600 from the loose object while at the same time protecting the occupant 1600 as the occupant 1600 begins to translate or rotate forward during, for example, a front-end collision when a front end of the vehicle is on a left-most side of the diagrams of FIGS. 16A, 16B, and 16C.

Figure 17A:
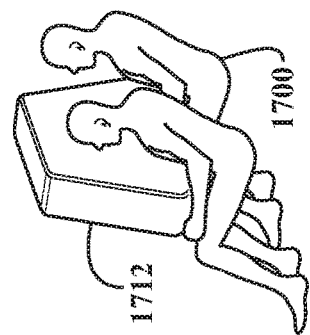
FIGS. 17A, 17B, and 17C show pre-collision diagrams using a combination of a roof airbag, a cabin divider, and a curtain airbag as part of an occupant safety system.
Figure 17B:
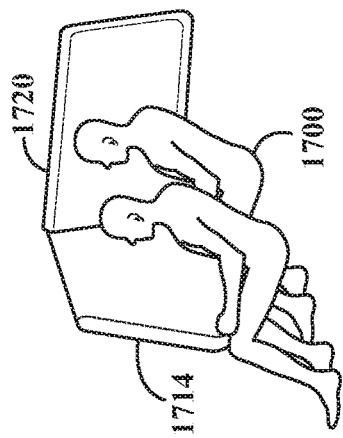
Figure 17C:
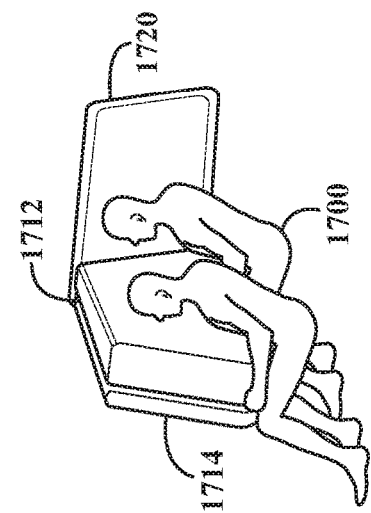

FIGS. 17A, 17B, and 17C show pre-collision diagrams using a combination of a roof airbag 1712, a cabin divider 1714, and a curtain airbag 1720 as part of an occupant safety system. FIG. 17A shows the roof airbag 1712 is a deployed position in front of a pair of occupants 1700 next to each other in front-facing seats, with the front of the vehicle on the left-most side of the diagram. FIG. 17B shows the cabin divider 1714 and the curtain airbag 1720 in a deployed position. The cabin divider 1714 and the curtain airbag 1720 move together between a stowed position (e.g. along the roof) to a deployed position so as to protect both the front and the side of the pair of occupants 1700 during an imminent collision. In this example, the curtain airbag 1720 acts as a tether to support the cabin divider 1714 and to guide its deployment in order to protect the pair of occupants 1700 from, for example, loose objects in an opposed row of seats during a collision. FIG. 17C shows three pieces of the occupant safety system working together: the cabin divider 1714 is deployed forward of the roof airbag 1712 in the vehicle cabin and both work together to protect the front of the pair of occupants 1700 while the curtain airbag 1720 protects the side of the pair of occupants 1700.

Figure 18:
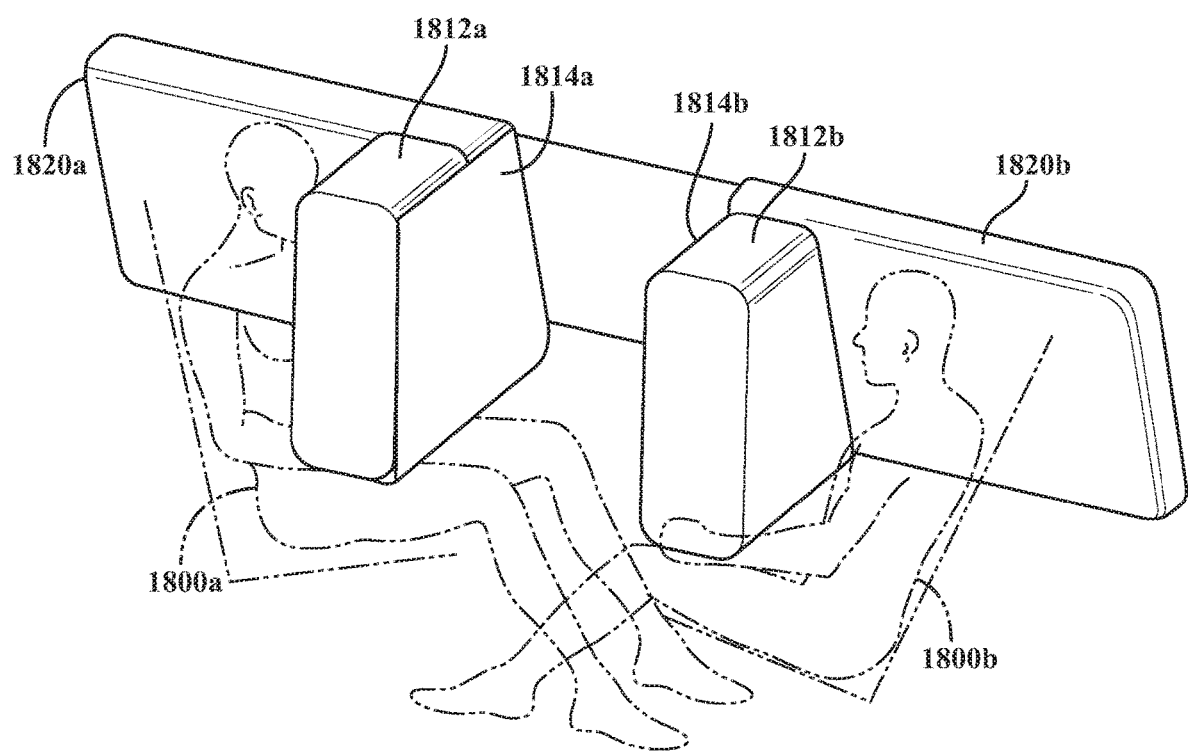
FIG. 18 shows the roof airbag, cabin divider, and curtain airbag of FIGS. 17A, 17B, and 17C used as part of an occupant safety system for use in an opposed seating system.

FIG. 18 shows the roof airbag 1712, cabin divider 1714, and curtain airbag 1720 of FIGS. 17A, 17B, and 17C, shown and described in FIG. 18 as roof airbags 1812a, 1812b, cabin dividers 1814a, 1814b, and curtain airbags 1820a, 1820b, used as part of an occupant safety system for use in an opposed seating system. A rear-facing occupant 1800a and an opposing, front-facing occupant 1800b are positioned within a passenger compartment. Prior to a collision, the curtain airbags 1820a, 1820b can deploy, acting as a tether to deploy the cabin dividers 1814a, 1814b. The roof airbags 1812a, 1812a can also be deployed so as to be positioned between the occupants 1800a, 1800b and the cabin dividers 1814a, 1814b. In this manner, both the front and the side of the occupants 1800a, 1800b can be protected during a collision. Though not shown in FIG. 17A, 17B, 17C, or 18, another side curtain airbag can be deployed on the other side of the occupants 1700, 1800a, 1800b to fully surround the occupants 1700, 1800a, 1800b with components of the occupant safety system. In another example, lapbelt airbags (not shown) can replace the roof airbags 1812a, 1812b in the occupant safety system shown in the examples of FIGS. 17A, 17B, 17C, and 18.

Figure 19A:
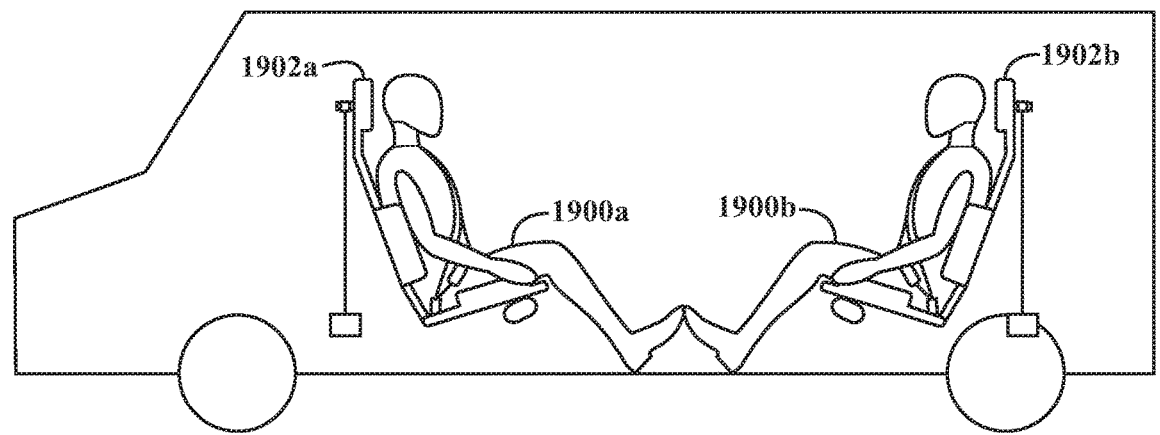
FIGS. 19A, 19B, and 19C show a motion diagram of a collision using a dynamic seating system as part of an occupant safety system for use in an opposed seating system.
Figure 19B:
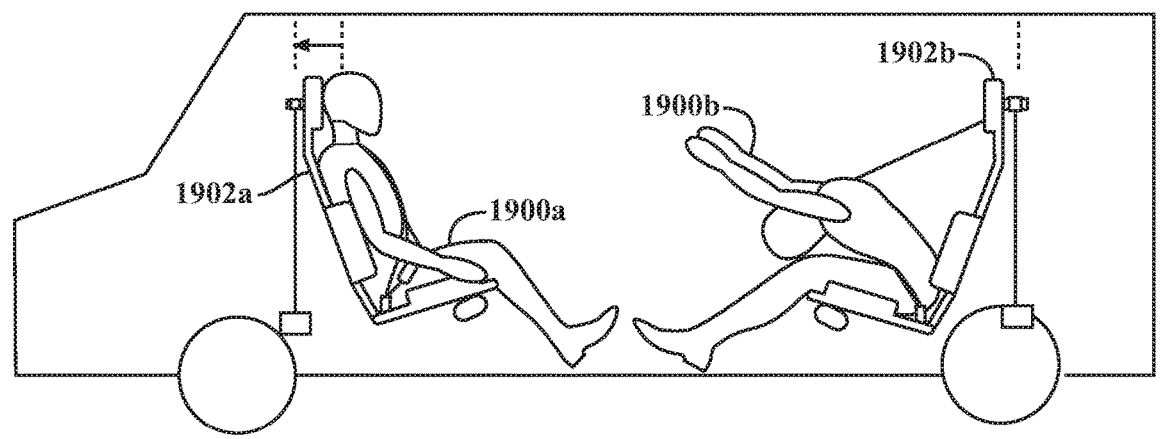
Figure 19C:
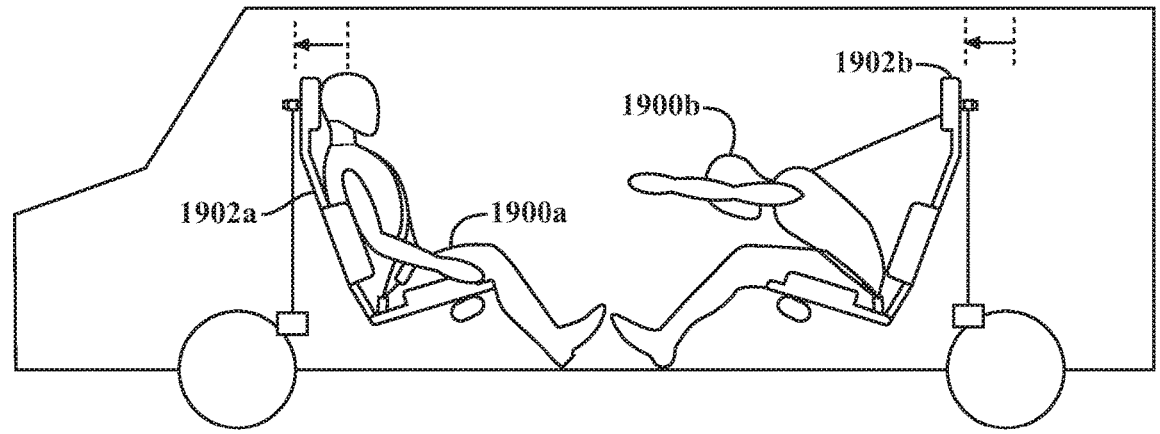

FIGS. 19A, 19B, and 19C show a motion diagram of a collision using a dynamic seating system as part of an occupant safety system for use in an opposed seating system. A dynamic seating system can include, for example, sensors serving as a source of vehicle information, occupant information, and position information, a motion control device configured to automatically adjust a position of the seats and/or tensioned restraints in the dynamic seating system using an application of force in respect to a seat support structure (not shown), and a control unit designed to control the force applied by the motion control device based on input from the sensors. In other words, a dynamic seating system is one in which automatic adjustments in positions of the seats and tensioned restraints in respect to the rest of the vehicle are possible.

Motion of the various components within the dynamic seating system can be achieved using a combination of mechanical, pneumatic, hydraulic, or other motion-inducing systems. Gross positioning of the seats can be achieved using the same electric-drive motors employed for traditional adjustment of the seats by the occupants. Fine actuation can be accomplished, for example, using a pneumatic system. During rapid adjustments, the electric-drive motors can be overdriven (by increasing the drive current over "regular" actuation current) to enable quickly reaching desired positions to better position occupants in a potential collision.

FIG. 19A shows a rear-facing seat 1902a securing a rear-facing occupant 1900a opposing a front-facing seat 1902b securing a front-facing occupant 1900b in an opposed seating system. During a front collision occurring on a left side of the frame with the vehicle moving to the left, the occupants 1900a, 1900b can be at risk of hitting each other. High loads can also be imposed on chests and necks of the occupants 1900a, 1900b in the absence of safety measures beyond traditional tensioned restraints. A dynamic seating system can be used to reposition the seats 1902a, 1902b to lessen risk to the occupants of injury during a collision.

FIG. 19B shows the rear-facing occupant 1900a and the front-facing occupant 1900b during a front collision, that is, a collision occurring at a left side of the frame while the vehicle moves to the left. The dynamic seating system reacts to the collision using the control unit to control force applied by the motion control device so as to cause movement or translation of the rear-facing seat 1902a to the left during the collision, moving the rear-facing occupant 1900a to the left by an amount indicated by the arrow shown above the rear-facing occupant 1900a. By moving the rear-facing seat 1902A away from the front-facing seat 1902b, a load induced on the rear-facing occupant 1900a is reduced and a risk of the front-facing occupant 1900b hitting the rear-facing occupant 1900a during the collision as the front-facing occupant 1900b bends forward is also reduced.

Movement or translation between the rear-facing seat 1902a and the front-facing seat 1902b can be accomplished using various motion control devices. In one example, dampers can be activated (or deactivated) under command of the control unit such that the rear-facing seat 1902a translates away from the front-facing seat 1902b along the seat support structure which may include, for example, rails. In another example, a release mechanism, such as a latch, can be released under command of the control unit such that dampers control movement of the front-facing seat 1902 in respect to the seat support structure by leveraging forces generated by both the rear-facing occupant 1900a and the rear-facing seat 1902a.

FIG. 19C also shows the rear-facing occupant 1900a and the front-facing occupant 1900b during a front collision. In this example, the dynamic seating system reacts to the collision using motion or translation of both the rear-facing seat 1902a and the front-facing seat 1902b to the left during the collision, moving both the rear-facing occupant 1900a and the front-facing occupant 1900b to the left by an amount indicated by the arrows shown above the rear-facing occupant 1900a and the front-facing occupant 1900b. Dual translation in the same direction of the rear-facing seat 1902a and the front-facing seat 1902b lowers the load induced on both the rear-facing occupant 1900a and the front-facing occupant 1900b and lowers the amount of travel of the front-facing occupant 1900b during the collision such that the risk of the front-facing occupant 1900b hitting the rear-facing occupant 1900a is decreased.

Figure 20A:
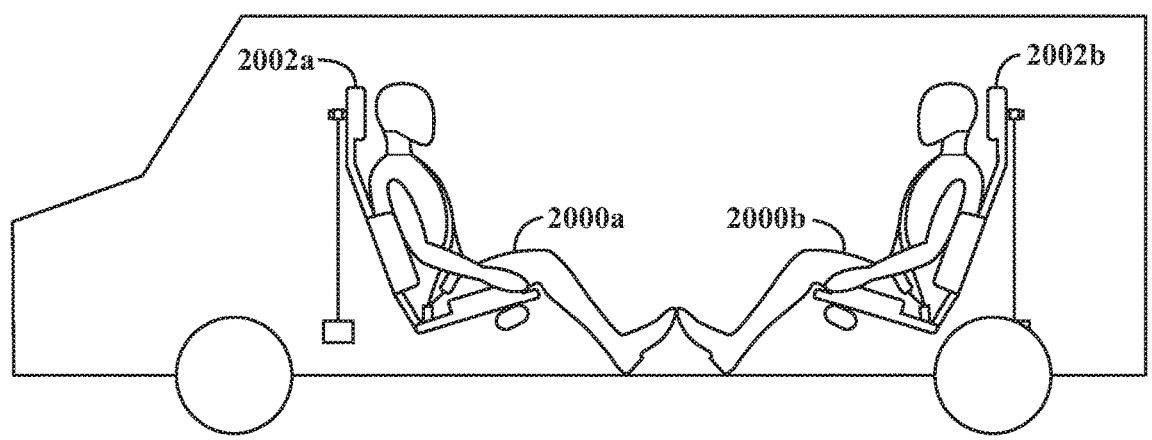
FIGS. 20A, 20B, and 20C show another motion diagram of a collision using another dynamic seating system as part of an occupant safety system for use in an opposed seating system.
Figure 20B:
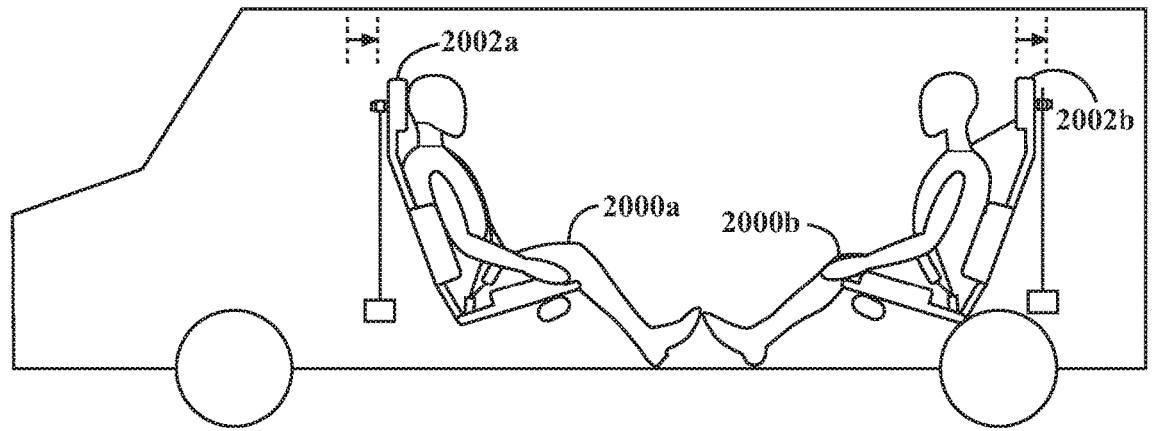
Figure 20C:
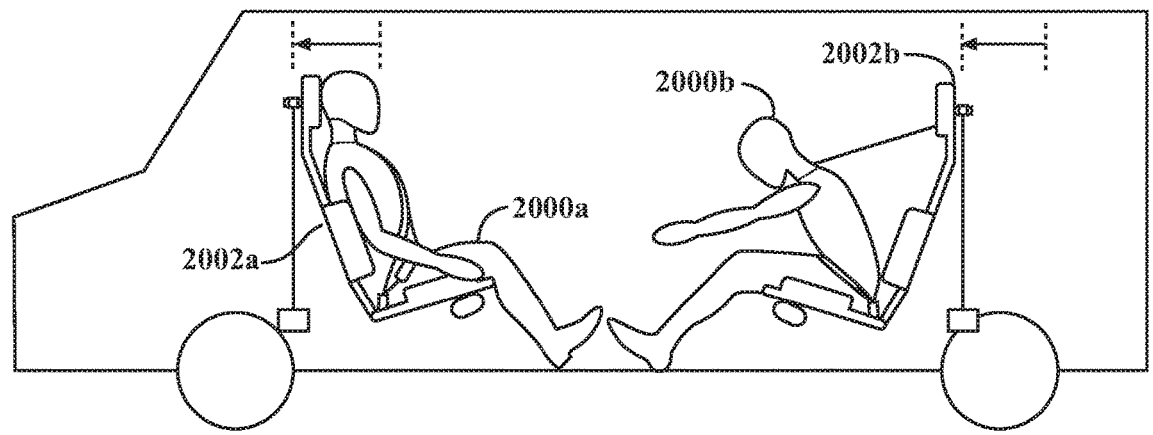

FIGS. 20A, 20B, and 20C show another motion diagram of a collision using another dynamic seating system as part of an occupant safety system. Though shown in reference to an opposed seating system, the dynamic seating system can also be implemented in a seating system where the rows of seats are front facing, side facing, rear facing, or some combination thereof. FIG. 20A shows a rear-facing seat 2002*a* securing a rear-facing occupant 2000*a* opposing a front-facing seat 2002*b* securing a front-facing occupant 2000*b*. During a front collision, occurring on a left side of the frame with the vehicle moving to the left, the occupants 2000*a*, 2000*b* can be at risk of hitting each other. High loads can also be imposed on chests and necks of the occupants 2000*a*, 2000*b* in the absence of safety measures beyond traditional tensioned restraints. A dynamic seating system can be used to reposition the both of the seats 2002*a*, 2002*b* to lessen risk to the occupants of injury during a collision.

FIG. 20B shows the rear-facing occupant 2000*a* and the front-facing occupant 2000*b* prior to a front collision. The dynamic seating system can be used to move one or both of the seats 2002*a*, 2002*b* both before and during the imminent collision. In FIG. 20B, the motion control device exerts a force to move both the rear-facing occupant 2000*a* and the front-facing occupant 2000*b* to the right to a determined position consistent with a distance indicated by the right-pointing arrows shown above the rear-facing occupant 2000*a* and the front-facing occupant 2000*b*. By moving the seats 2002*a*, 2002*b* and the occupants 2000*a*, 2000*b* to the right, that is, away from the imminent collision, additional travel to the left during the collision is possible, further limiting the loads experienced by the occupants 2000*a*, 2000*b* during the collision.

FIG. 20C shows the rear-facing occupant 2000*a* and the front-facing occupant 2000*b* during a front collision. The dynamic seating system reacts to the collision by using the motion control device to allow (or impart force to cause) motion or translation of both the rear-facing seat 2002*a* and the front-facing seat 2002*b* to the left during the collision, moving both the rear-facing occupant 2000*a* and the front-facing occupant 2000*b* to the left to a determined position consistent with a distance indicated by the arrows shown above the rear-facing occupant 2000*a* and the front-facing occupant 2000*b*. Again, dual translation lowers the load induced on both the rear-facing occupant 2000*a* and the front-facing occupant 2000*b* and reduces the risk of the front-facing occupant 2000*b* hitting the rear-facing occupant 2000*a*. Dual translation over a longer distance as shown in FIG. 20C lowers loadings and risks further than the dual translation shown in FIG. 19C.

Though the examples described in respect to FIGS. 19A, 19B, 19C, 20A, 20B, and 20C are described in the context of an opposed seating system, the examples can be implemented in vehicles with other seating configurations as well. For example, vehicles with two or more rows of front-facing seats, two or more rows of rear-facing seats, a single front-facing row of seats, or a single rear-facing row of seats can implement the dynamic seating systems described above.

Figure 21:
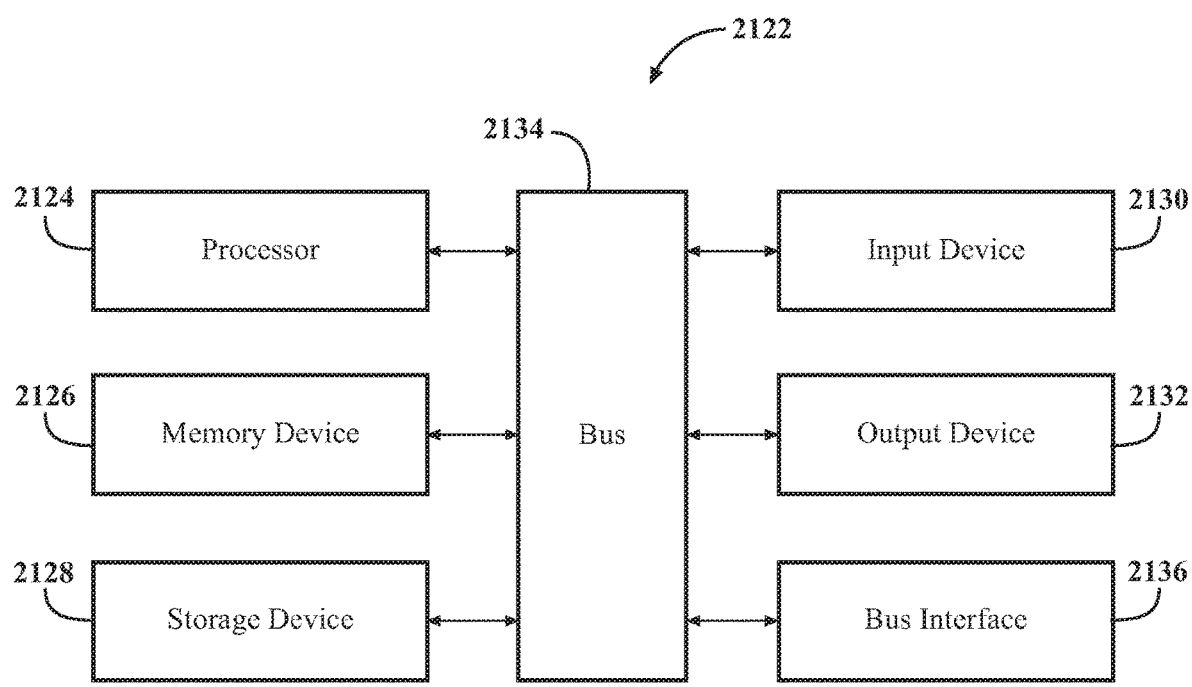
FIG. 21 is a block diagram of an example of a computing device.

FIG. 21 is a block diagram of an example of a computing device 2122. The computing device 2122 can be a single computing device or a system that includes multiple computing devices working cooperatively. As an example, the computing device 2122 can be a vehicle-based computing device such a control unit or a vehicle ECU. Alternatively, the computing device 2122 can be a desktop computer, a laptop computer, a tablet, or a mobile device such as a smart phone.

In the example where the computing device 2122 is a control unit, the control unit can be operable to send commands to various components of the safety systems in the above-described embodiments. For example, the control unit can send commands to belt tensioners, airbag inflators, seat motors, tether couplings, etc. in order to cause deployment of airbags, deployment of cabin dividers, motion of seats in a dynamic seating system, etc. That is, the control unit can send commands to implement various safety measures in the various occupant safety systems described herein.

In the illustrated example of FIG. 21, the computing device 2122 includes a processor 2124, a memory device 2126, a storage device 2128, one or more input devices 2130, and one or more output devices 2132 which are interconnected by a bus 2134. The computing device 2122 can also include a bus interface 2136 for connecting peripheral devices to the bus 2134.

The processor 2124 can be any type of device that is able to process or manipulate information, including devices that are currently known and devices that may be developed in the future. As an example, the processor 2124 can be a conventional central processing unit (CPU). Although the illustrated example shows a single processor, multiple processors can be used instead of a single processor.

The memory device 2126 can be used to store information for immediate use by the processor 2124. The memory device 2126 includes either or both of a random access memory (RAM) device and a read only memory (ROM) device. The memory device 2126 can be used to store information, such as program instructions that can be executed by the processor 2124, and data that is stored by and retrieved by the processor 2124. In addition, portions of the operating system of the computing device 2122 and other applications that are being executed by the computing device 2122 can be stored by the memory device during operation of the computing device 2122.

The storage device 2128 can be used to store large amounts of data persistently. As examples, the storage device 2128 can be a hard disk drive or a solid state drive.

The input devices 2130 can include any type of device that is operable to generate computer interpretable signals or data in response to user interaction with the computing device 2122, such as physical interaction, verbal interaction, or non-contacting gestural interaction. As examples, the input devices 2130 can include one or more of a keyboard, a mouse, a touch-sensitive panel with or without an associated display, a trackball, a stylus, a microphone, a camera, or a three-dimensional motion capture device.

The output devices 2132 can include any type of device that is able to relay information in a manner that can be perceived by a user. As examples, the output devices 2132 can include one or more of an LCD display screen, an LED display screen, a CRT display screen, a printer, an audio output device such as a speaker, or a haptic output device. In some implementations, the output devices 2132 include a display screen and the input devices 2130 include a touch sensitive panel that is integrated into the display screen to define a touch-sensitive display screen.

The bus 2134 transfers signals and/or data between the components of the computing device 2122. Although depicted as a single bus, it should be understood that multiple or varying types of buses can be used to interconnect the components of the computing device 2122. The bus interface 2136 can be any type of device that allows other devices, whether internal or external, to connect to the bus 2134. In one implementation, the bus interface 2136 allows connection to a controller area network (CAN) bus of a vehicle.

What is claimed is:

1. An occupant safety system, comprising:
 a sensor that provides an output signal indicative of an imminent collision;

a roof airbag deployable from a location on a roof of a vehicle that is forward of location of a seat in the vehicle into a vehicle cabin based on the output signal; and a tether, comprising:
 a first end coupled to a bottom corner of the roof airbag at a first anchor location configured to be positioned in front of an occupant secured in the seat during the imminent collision; and
 a second end coupled to the vehicle at a second anchor location positioned behind the seat during the imminent collision,
wherein a top of the roof airbag is configured to decouple from and become spaced from the roof of the vehicle upon deployment and move downward into the vehicle cabin to a position configured to restrain a head and a torso of the occupant during the imminent collision.

2. The system of claim 1, wherein the roof airbag comprises a pair of chambers allowing for variable stiffness along a width of the roof airbag.

3. The system of claim 2, wherein a first chamber of the pair is located farther from the location of the occupant being restrained and has a higher stiffness than a second chamber of the pair that is located closer to the location of the occupant being restrained such that the first chamber maintains a position of the second chamber during the imminent collision.

4. The system of claim 1, further comprising:
 a seatbelt comprising a lap portion configured to secure the occupant to the seat of the vehicle; and
 a lapbelt airbag deployable from the lap portion of the seatbelt into the vehicle cabin based on the output signal,
wherein the lapbelt airbag is configured to deploy at a position in the vehicle between the location of the occupant secured to the seat and the location of the roof airbag, and
wherein the roof airbag is configured to serve as a reaction surface for the lapbelt airbag and the lapbelt airbag is configured to serve as a reaction surface for a head and torso of the occupant.

5. The system of claim 4, wherein the lapbelt airbag is configured to react against a lap of the occupant and to react against the roof airbag during deployment of the lapbelt airbag.

6. The system of claim 1, wherein the tether is a first tether, comprising:
 a second tether, comprising:
  a first end coupled to another corner of the roof airbag at a third anchor location configured to be positioned in front of the occupant secured in the seat during the imminent collision; and
  a second end coupled to the vehicle at a fourth anchor location positioned behind the seat during the imminent collision.

7. The system of claim 6, wherein the third anchor location is positioned at a top corner of the roof airbag, wherein the fourth anchor location is positioned above the seat, and wherein the second anchor location and the fourth anchor location are spaced vertically apart and positioned on a rear surface of the vehicle behind the seat.

8. The system of claim 6, wherein the first anchor location and the third anchor location are spaced apart and positioned at respective bottom corners of the roof airbag.

9. The system of claim 8, wherein the second anchor location and the fourth anchor location are spaced apart and positioned on the roof of the vehicle above and behind the seat.

10. The system of claim 9, wherein the first tether and the second tether extend in a generally horizontal manner from the roof airbag to a rear surface of the vehicle when the roof airbag is deployed.

11. An occupant safety system, comprising:
 a sensor that provides an output signal indicative of an imminent collision;
 a roof airbag configured to deploy from a location on a roof of a vehicle forward of a location of an occupant into a vehicle cabin based on the output signal;
 a seatbelt comprising a lap portion configured to secure the occupant to a seat of the vehicle; and
 a lapbelt airbag configured to deploy from the lap portion of the seatbelt into the vehicle cabin and toward the roof based on the output signal,
wherein the lapbelt airbag is configured to deploy at a position in between the locations of the occupant and the roof airbag,
wherein the roof airbag is configured to serve as a reaction surface for the lapbelt airbag during the imminent collision, and
wherein the lapbelt airbag comprises at least one of:
 horizontally-extending chambers allowing for variable pressures along a height of the lapbelt airbag and variable heights of deployment of the lapbelt airbag; or
 vertically-extending chambers allowing for variable stiffness along a width of the lapbelt airbag.

12. The system of claim 11, wherein the roof airbag has a higher pressure than a pressure of the lapbelt airbag.

13. The system of claim 12, wherein the lapbelt airbag is configured to react against a lap of the occupant and configured to react against the roof airbag during the imminent collision.

14. The system of claim 11, wherein a top of the roof airbag is configured to decouple from the roof of the vehicle upon deployment and move downward into the vehicle cabin to a position configured to restrain a head and a torso of the occupant during the imminent collision.

15. The system of claim 11, wherein the roof airbag comprises:
 a first vertically-extending chamber located farther from the location of the occupant being restrained; and
 a second vertically-extending chamber located closer to the location of the occupant being restrained,
wherein the first vertically-extending chamber has a higher stiffness than the second vertically-extending chamber such that the first vertically-extending chamber maintains a position of the second vertically-extending chamber during the imminent collision.

16. The system of claim 11, wherein the lapbelt airbag comprises the vertically-extending chambers, and wherein a central vertically-extending chamber has a higher stiffness than outer vertically-extending chambers to maintain a position of the outer vertically-extending chambers during the imminent collision.

17. The system of claim 11, further comprising:
 a tether, comprising:
  a first end coupled to the roof airbag at a first anchor location configured to be positioned in front of the location of the occupant during the imminent collision; and a second end coupled to the vehicle at a second anchor location configured to be positioned behind the location of the occupant during the imminent collision.

18. An occupant safety system, comprising:
a sensor that provides an output signal indicative of an imminent collision;
a roof airbag configured to deploy from a location on a roof of a vehicle forward of a location of a seat in a vehicle cabin of the vehicle based on the output signal, wherein the roof airbag includes a first chamber having a higher stiffness than a second chamber such that the first chamber maintains a position of the second chamber during the imminent collision, and
wherein a top of the roof airbag is configured to decouple from and become spaced from the roof of the vehicle upon deployment and move downward into the vehicle cabin to a position configured to restrain a head and a torso of an occupant secured in the seat during the imminent collision; and
a tether extending from a first end coupled to the roof airbag at a first anchor location positioned in front of the location of the seat to a second end coupled to the vehicle at a second anchor location positioned behind the location of the seat.

19. The system of claim 18, further comprising:
a seatbelt comprising a lap portion configured to secure the occupant to the seat of the vehicle; and
a lapbelt airbag deployable from the lap portion of the seatbelt into the vehicle cabin based on the output signal,
wherein the lapbelt airbag is configured to deploy at a position in the vehicle between the location of the occupant secured to the seat and the location of the roof airbag, and
wherein the roof airbag is configured to serve as a reaction surface for the lapbelt airbag and the lapbelt airbag is configured to serve as a reaction surface for the head and the torso of the occupant.

20. The system of claim 19, wherein the roof airbag has a higher pressure than a pressure of the lapbelt airbag.

* * * * *